(No Model.) 2 Sheets—Sheet 1.
P. LANE.
MACHINE FOR BORING COB PIPES.
No. 516,208. Patented Mar. 13, 1894.
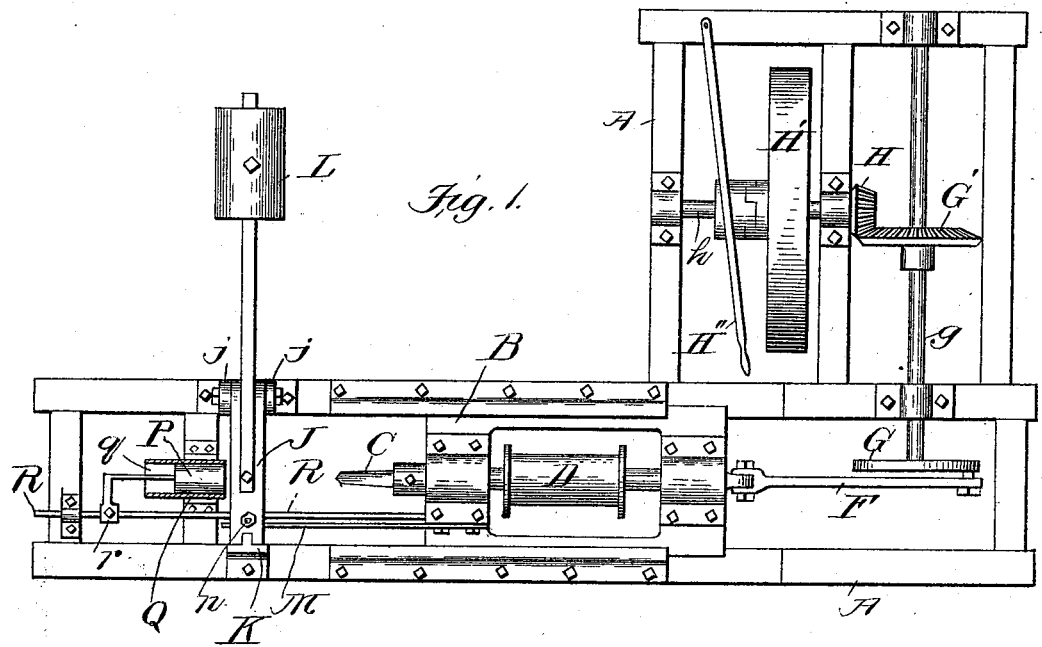
Fig. 1.
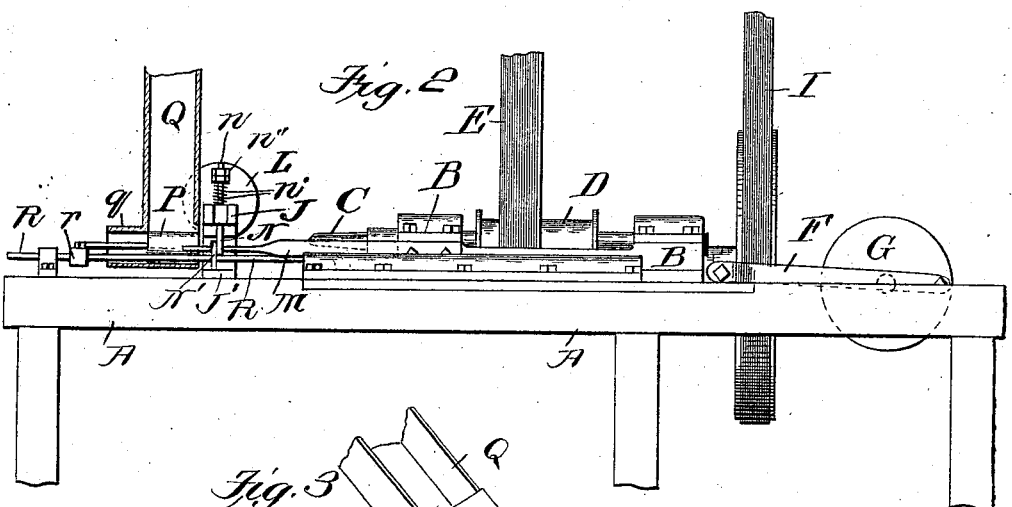
Fig. 2.
Fig. 3.
Witnesses
J. R. Cornwall
A. Ramel
Inventor
Price Lane
By Paul Bakewell
his atty.

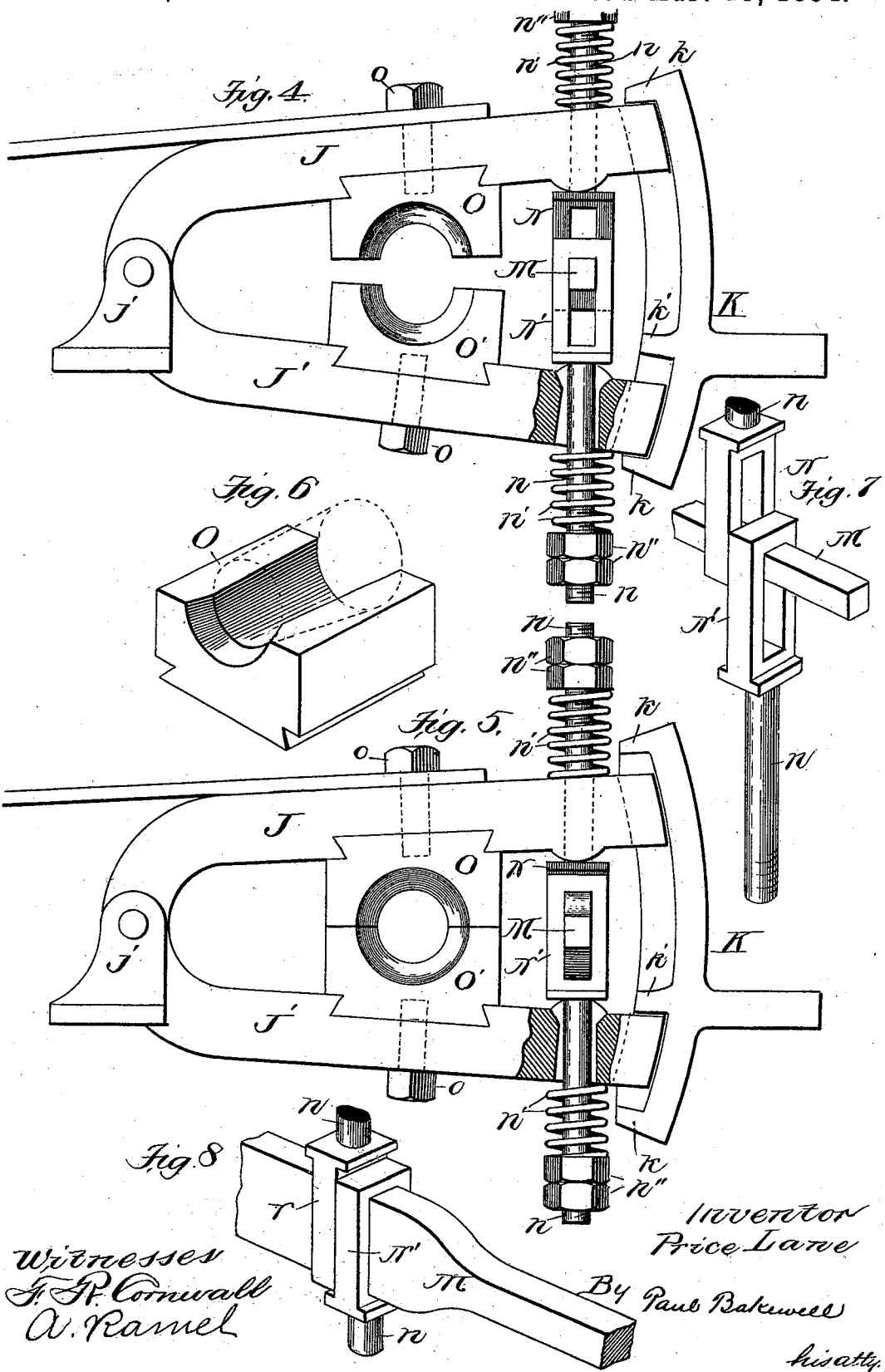

UNITED STATES PATENT OFFICE.

PRICE LANE, OF ST. LOUIS, MISSOURI.

MACHINE FOR BORING COB PIPES.

SPECIFICATION forming part of Letters Patent No. 516,208, dated March 13, 1894.

Application filed May 12, 1893. Serial No. 473,958. (No model.)

*To all whom it may concern:*

Be it known that I, PRICE LANE, a citizen of the United States, residing in the city of St. Louis, State of Missouri, have invented certain new and useful Improvements in Machines for Boring Cob Pipes, of which the following is a full, clear, and exact description, reference being had to the accompanying drawings, forming a part of this specification, wherein like symbols of reference refer to like parts wherever they occur, and in which—

Figure 1 is a top plan view. Fig. 2 is a side elevation. Fig. 3 is a detail perspective view of the feed chute. Fig. 4 is a detail front elevation of the clamping jaws for the pipe, showing them in open position. Fig. 5 is a similar view showing the jaws in a closed position. Fig. 6 is a detail of one of the clamping and centering blocks removed. Fig. 7 is a perspective view of the slide blocks of the jaws, showing the same in a position assumed when the jaws are open. Fig. 8 is a similar view, showing the position assumed when the jaws are closed.

My invention relates to a new and useful improvement in a machine for boring the bowls of corn-cob pipes, and consists, generally stated, in combining with a reciprocating boring bit, clamping and centering jaws for the pipe bowl which open and close automatically, and the means for feeding the bowls automatically to the jaws. This object I obtain by the construction illustrated in the accompanying drawings, wherein—

A indicates a suitable frame or support, upon which is slidingly mounted a bit carriage B. This carriage has journaled therein a spindle, upon the forward end of which the bit C is mounted.

D indicates a pulley mounted on the spindle, which is driven by a belt E, which belt passes over a driving pulley mounted on a countershaft (not shown).

Pivotally connected to the rear of the carriage is a pitman F, its other end being connected to, and operated by, a crank disk G, which disk is mounted upon the end of a shaft g, receiving motion therethrough, through the medium of a gear wheel G' mounted thereon, with which gear meshes a pinion H mounted on a shaft h, said shaft being driven through a pulley H' by a belt I passing thereover, said belt passing over and being driven by a pulley on a countershaft (not shown). It will be noted that the pulley H' being of large diameter, will revolve slowly in order not to reciprocate the bit carriage too rapidly, while the pulley D being of small diameter, will be driven at a high rate of speed, which is necessary for the bit. If desirable, a suitable clutch coupling may be arranged in conjunction with the pulley H' and a suitable controlling lever H'' mounted on the frame and extending forward to a position convenient to the operator.

Pivoted to the frame in a bracket j are two jaws J and J' which grasp and hold the cob while the same is operated upon by the bit C. These jaws are guided in their movement by a guide K mounted upon the frame, which guide is substantially T-shaped in cross-section, its web or flange being on its concave face, and fitting into a groove formed in the ends of the jaws, thus preventing lateral vibration. This guide also limits the movement of the jaws when in their open position, by stops k projecting therefrom at its top and bottom.

To align the cob opening with the bit, I form a stop k' on the guide, which stop limits the upward movement of the lower jaw when the same is being raised to close with its companion, as will presently appear. The upper jaw is raised from its closed position through the medium of a weight L, which acts in the capacity of a counterbalance. The jaws are closed on the cob, and grasp it tightly just before the bit acts thereon, by a slide bar M mounted on the reciprocating carriage, which, when the carriage is forced forward by its pitman, forces the slide-bar forward, so that its two cam faces engage with the slide blocks N and N' mounted on the jaws J and J' respectively, and closes them. These slide blocks are formed with openings for the reception of the slide-bar, with which they always engage; either its small forward end, when the carriage is retracted, as shown in Figs. 2, 4, and 7 at which time the jaws are open, or its enlarged portion, as shown in Figs. 5 and 8, at which time the jaws are closed. By the slide blocks overlapping each other, the lower cam face engages the slide block on the upper jaw, and its upper face the block on the lower jaw, which operates the jaws properly, relative to the position of the bit. The cam faces on the slide bar are located slightly in advance of the point of the bit, which arrangement insures the jaws grasping the cob before it is acted upon by the bit. Another feature of this slide bar is its parallel faces on different planes, which permit the jaws to remain stationary either in an open or closed position for some time, where the carriage is at either extremity of its stroke, thus permitting the removal of the bored cob or bowl and the insertion of an unbored cob while the carriage is being retracted, and, when the carriage is being moved forward, the jaws will grasp the bowl, and hold it for the action of the bits while it is entering and until it is withdrawn. The slide blocks are formed with threaded extensions $n$ which pass through slots formed in the jaws, and have surrounding their outer ends spiral compression springs $n'$ which are confined between the jaws and jam nuts $n''$ on the threaded extensions, through which nuts the tension of the springs may be regulated for purposes hereinafter described. The jaws are formed with curved bearing faces at the side of the slots, upon which are received the slide blocks N and N'. The blocks are formed with shoulders which extend out and rest on the curved faces in order to accommodate the different relative positions of the blocks and the jaws, when the jaws move in an arc of a circle, and the blocks are confined to a vertical movement received from the slide bar, with which they bear a given relation. The cobs are centered and clamped between two blocks O and O' which are removably mounted or keyed in the inner faces of the jaws, being prevented from accidental removal by bolts $o$. These clamping and centering blocks are recessed semicircularly to a shape corresponding nearly to the contour of a cob in the rough, that is, the recesses are formed tapering toward the front end of the machine, so as to more firmly grasp the cob when its butt-end is presented to the action of the bit. To guide the cob while it is being inserted between the blocks, I preferably bevel the front edges around the recesses for purposes which will be understood.

The cobs are automatically fed to the jaws by a plunger P reciprocating in the bottom of a chute Q. This plunger is attached to the carriage by a rod R, which rod is connected to and operates the plunger by an adjustable cross head $r$. The chute or way is preferably formed with an extension $q$ which forms a bearing for the plunger, and an opening which is in alignment with the bit.

The operation is as follows: The rough cobs, cut to the proper length, are placed in the chute, the lowermost resting on the plunger, and the rest, by reason of the incline of the chute, crowding it. The machine being started, say from the position shown in Figs. 1 and 2, the belt E revolving the bit, and the belt I reciprocating the carriage; upon the forward movement of the carriage, the slide bar will close the jaws, and the bit being centered relatively thereto, will enter the recess formed by the centering and clamping blocks. The plunger will at this same operation, be forced forward from beneath the line of cobs which will permit the lowermost to fall to the bottom of the chute to the position lately occupied by the plunger. When the carriage is retracted, carrying with it the bit, the jaws will be opened, and the plunger forced toward the jaws. This movement of the plunger will force the cob which is in its path on to the recess in the lower jaw, at the same time preventing the line above from forcing the bottom cob into the chute, by its extreme length cutting them off. Upon the forward movement of the carriage again, the jaws will be closed on the cob placed therebetween by the plunger, the plunger withdrawn to permit another cob to fall in its path, and the bit will enter the grasped cob. When the carriage is again retracted, the bit will be withdrawn, the jaws opened, and the plunger moving toward the jaws, will shove the pipe before it, between the jaws, at the same time forcing the bored pipe out. Should a cob of large diameter be inserted between the jaws, the springs $n''$ will yield thus preventing the jaws from crushing the cob, or in any way affecting the operation of the machine.

Having thus described my invention, what I claim, and desire to secure by Letters Patent, is—

1. In a machine for boring cob pipes, the combination with a reciprocating bit-carriage and its bit, of clamping and centering jaws for holding the cob to the action of the bit, slide-blocks on the jaws, provided with registering grooves, and slide-bar on the carriage, provided with cam-faces, which engage and operate the jaws through the medium of the block, substantially as described.

2. In a machine for boring cob pipes, the combination with a reciprocating carriage and its bit, of clamping and centering jaws for holding the cob to the action of the bit, a guide for the jaws, stops on the guide for limiting the opening movement of the jaws, and means carried by the carriage for opening and closing the jaws, substantially as described.

3. In a machine for boring cob pipes, the combination with a reciprocating carriage and its bit, of clamping and centering jaws for the cob, slotted slide blocks yieldingly mounted on the jaws, and a slide bar formed with cam faces, mounted on the reciprocating carriage, substantially as and for the purposes described.

4. In a machine for boring cob pipes, the combination with a reciprocating carriage and its bit, of clamping and centering jaws for the cob, slotted slide blocks mounted on the jaws and overlapping each other so that their slots register, means carried by the carriage for engaging the slide-blocks through the medium of their registering slots for opening and closing the jaws, threaded extensions on the blocks which pass through the jaws, jam nuts on said threaded extensions, and springs interposed between jaws and jam nuts, substantially as and for the purposes described.

5. In a machine for boring cob pipes, the combination with a bit, of pivoted jaws, clamping and centering blocks removably secured on the inner faces of the jaws, said blocks being formed with tapering semi-circular recesses and a bevel around the entrance end of the recesses, substantially as and for the purposes described.

6. In a machine for boring cob pipes, the combination with the reciprocating carriage and its bit, of pivoted clamping and centering jaws, a guide for said jaws, provided with stops to limit their movement and register the cob opening with the bit, a counterbalance on the upper jaw, and means carried by the bit carriage for closing the jaws, substantially as and for the purposes described.

7. In a machine for boring cob pipes, the combination with a reciprocating carriage and its bit, of clamping and centering jaws for the cob, means carried by the carriage for closing said jaws on the cob in advance of the action of the bit therein, a weight for opening the jaws when released by the carriage, a feed chute, having its discharge end in advance of and in line with the opening in the clamping jaws, and a plunger, which operates therein, to feed the unbored cobs to the jaws, and force the bored cobs out, said plunger being of such length as to cut off the cobs thereabove when advancing to place a cob between the jaws, substantially as described.

8. In a machine for boring cob pipes, the combination with a reciprocating carriage and its bit, of centering and clamping jaws for the cob, which jaws are operated to open and close around the cob, as the carriage reciprocates, a feed chute located in front of the jaws and in line with the opening therein, and a plunger for feeding the unbored cobs to the jaws and for forcing the bored cobs out, said plunger being attached to and operated by the carriage so as to act correlatively with the opening and closing of the jaws, substantially as described.

In testimony whereof I hereunto affix my signature, in presence of two witnesses, this 26th day of April, 1893.

PRICE LANE.

Witnesses:
F. R. CORNWALL,
HUGH K. WAGNER.